Aug. 12, 1952     C. F. HASSELWANDER     2,606,628
FILTER

Filed Oct. 25, 1947     3 Sheets-Sheet 1

INVENTOR.
CLAUDE F. HASSELWANDER
BY
ATTORNEY

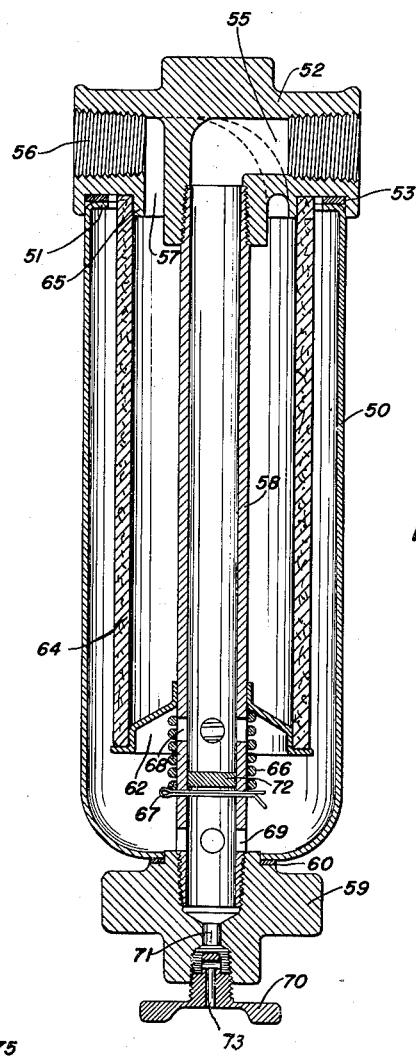
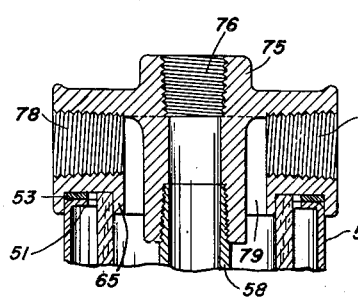

Aug. 12, 1952 C. F. HASSELWANDER 2,606,628
FILTER
Filed Oct. 25, 1947 3 Sheets-Sheet 3

INVENTOR.
CLAUDE F. HASSELWANDER
BY
ATTORNEY

Patented Aug. 12, 1952

2,606,628

UNITED STATES PATENT OFFICE 2,606,628

FILTER

Claude F. Hasselwander, Rochester, N. Y.

Application October 25, 1947, Serial No. 782,065

8 Claims. (Cl. 183—73)

The present invention relates to filter units and to filters and particularly to units and to filters for cleaning air and other fluids.

Conventional filter units are provided with separate spaced inlet and outlet openings. The fluid, which is to be filtered, is admitted through the inlet opening and the filtered fluid is drawn off through the outlet opening. When a conventional filter unit is employed in a storage tank or other vessel, it is necessary to provide spaced inlet and outlet openings in the vessel, also, for admission of the fluid to the filter and for drawing off the filtered product, respectively. The plural openings in a filter unit or in a vessel, naturally multiply the problems of sealing the connections of the inflow and outflow ducts with the unit or vessel. If the fluid, which is to be filtered, is a chemical and a glass-lined tank has to be employed, the problems are increased, for it is extremely difficult to maintain a chemical-tight glass lining around the welded inlet and outlet connections ordinarily used. The chemical will eventually seep in under the glass around the inlet or outlet opening and eat into the metal of the tank.

One type of filter, that is extensively used in filtering compressed air and other fluids under pressure, is a cloth covered wire that is corrugated and rolled into the general shape of a cylinder. The corrugations increase the filtering surface without increasing the space required for the filter. Heretofore, however, it has been necessary to press out tongues from the filter-holder to engage the corrugations to hold the filter in corrugated shape, or to secure clips to the filter-holder for this purpose.

One object of the present invention is to provide a filter unit in which but one opening need be provided for connection to the unit of both inlet and outlet ducts.

A further object of the present invention is to provide a filter unit which can be used readily in a storage vessel, glass-lined or otherwise, and which will obviate the need for separate inlet and outlet openings in the vessel.

Another object of the invention is to provide a filter unit for use with a glass-lined or similar tank in which the interior of the tank can be kept smooth and free of both inlet and outlet welds.

Another object of the invention is to provide a filter unit which will be extremely compact.

Other objects of the invention are to provide a filter unit having a minimum number of parts and which can be assembled easily and quickly and which will be relatively inexpensive.

A still further object of the invention is to provide a round corrugated wire filter for filter units which will be self-sustaining and which will not require provision of any special means in the filter unit, in which it is used, to hold its corrugations in place.

Other objects of the invention will be apparent hereinafter from the specification and from the recital of the appended claims.

In the drawings:

Fig. 3 is a vertical sectional view of a filter unit made according to another embodiment of this invention;

Fig. 4 is a sectional view of a fitting which may be used with the embodiment of the invention illustrated in Fig. 3 and which will permit distribution of the filtered air or liquid to two separate branch lines;

Figure 1:
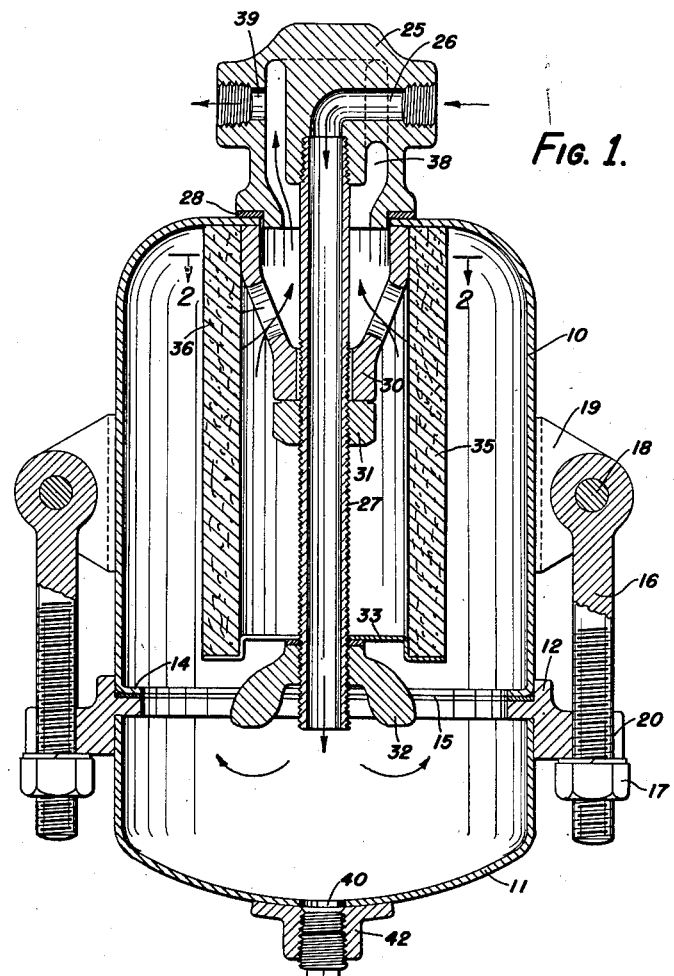
Fig. 1 is a vertical sectional view showing a pressure vessel fitted with a filter unit made according to one embodiment of the present invention.
Figure 2:
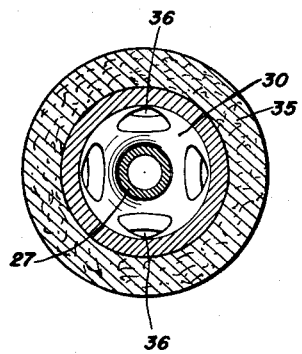
Fig. 2 is a section on the line 2—2 of Fig. 1 looking in the direction of the arrows.
Figure 5:
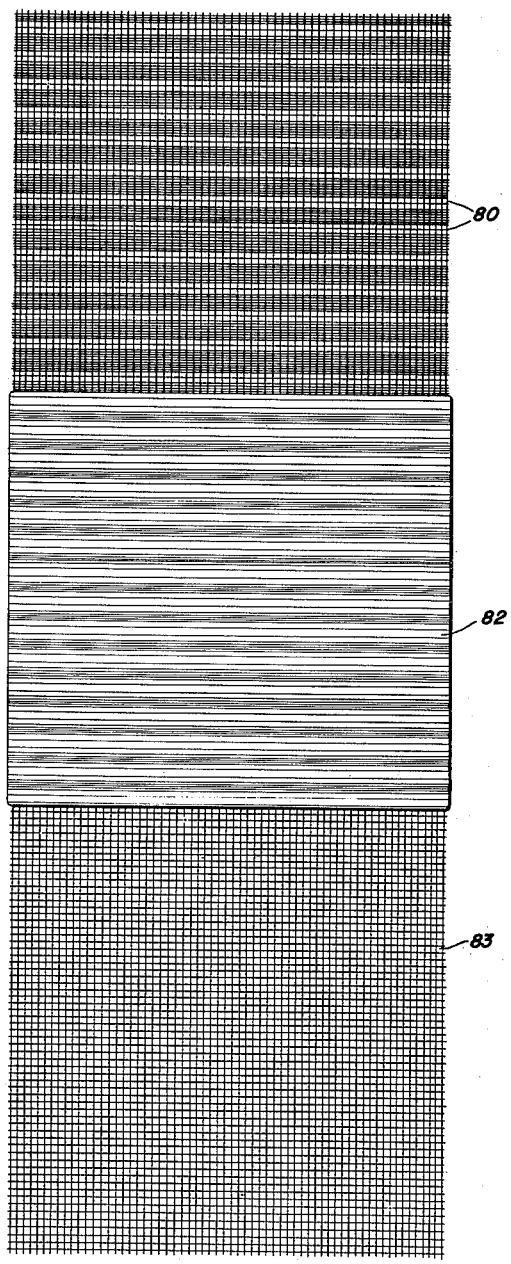
Fig. 5 is an unwrapped view of a corrugated filter made according to this invention and employable in filter units made according to this invention.
Figure 6:
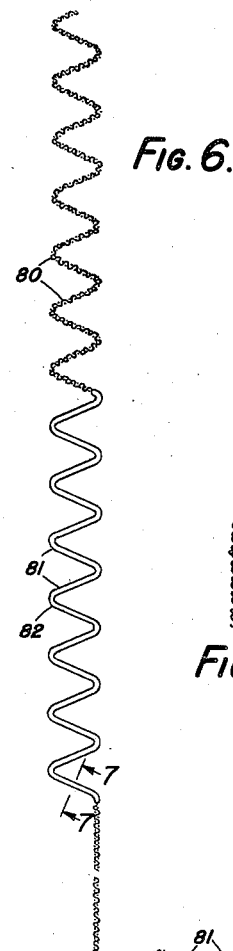
Fig. 6 is a partial end view of this unwrapped filter.
Figure 7:
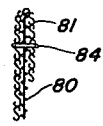
Fig. 7 is a sectional view on the line 7—7 of Fig. 6.

Referring now to Figs. 1 and 2, 10 denotes the upper part and 11 the lower part of a pressure vessel or storage tank. The lower part 11 is welded or otherwise secured to a ring 12. The upper part 10 has a flange 14 turned inwardly at its bottom and between this flange and the ring 12 there is interposed a gasket 15. The two parts 10 and 11 of the vessel are secured together by bolts 16 and nuts 17. The bolts 16 are pivotally connected by means of pins 18 to ears 19 that are welded to the outside of the upper part 10. They engage in slots 20 on the rings 12.

Instead of having two openings cut into it, one for admission of the air or other fluid which is to be filtered and the other for passage from the vessel of the filtered product, one opening in the vessel serves both purposes because of the use in the vessel of a filter unit constructed according to the present invention. This opening in the embodiment illustrated is at the top of the upper part 10 of the vessel. Mounted in this opening is a fitting 25. This fitting is formed with a right angular duct 26, with a recess 38 which surrounds the vertical leg of duct 26, and with a duct 39 which communicates with recess 38. The duct 26 constitutes an inlet duct, while the duct 39 is the outlet duct.

The duct 26 is threaded at its outer end so as to be connectable to a pipe or other conduit for the fluid that is to be filtered. At its inner end it is threaded to connect with a hollow bolt or pipe 27. The duct 39 is threaded at its outer end for connection with a pipe or other form of conduit for conducting the filtered fluid away from the vessel.

Interposed between the fitting 25 and vessel section 10 is a gasket 28. The fitting is secured to the vessel by a yoke 30 and a nut 31. The yoke is adapted to slip over the hollow bolt 27 and to abut at its upper end against the inside of the vessel section 10 around the opening therein. The nut 31 is adapted to thread on the hollow bolt 27 so as to draw the yoke 30 tight up against the inside of the vessel and simultaneously draw the fitting 25 down tight against the outside of the vessel.

Threaded on the hollow bolt 27 is a wing nut 32. This is adapted to support a generally flat plate 33. The plate 33 in turn supports a filter 35. This filter may be of any suitable construction. It may be of known design or it may be of the novel construction of the filter hereinafter to be described. The upper end of the filter is adapted to abut against the inside surface of the top of the vessel, and the filter is of generally cylindrical shape so as to surround the yoke 30 and the opening in the vessel. The yoke member 30 has a plurality of angularly spaced holes 36 therethrough which connect the filter with recess 38 of fitting 25 when the parts are in operative positions.

In use, the air, or other fluid to be cleaned, is admitted to the vessel through the duct 26 and the hollow bolt 27. As it leaves the lower end of bolt 27 it is travelling at high velocity, and heavy particles of dirt or moisture carried by it impinge upon and are precipitated against the bottom wall of the vessel. When the outlet duct is open, the fluid moves upwardly and inwardly through the filter 35, the holes 36 in the yoke 30, the recessed portion 38 in the fitting 25, and the duct 39 to the conduit for use. As it passes through the filter 35 it is travelling at greatly reduced speed and it is cleaned of whatever other impurities it has been carrying.

A drain opening 40 is provided in the bottom of the vessel to permit draining off the collected water and for removing the collected dirt. This drain opening is normally closed by a plug 41 that threads into the collar 42 which is welded on the bottom of the vessel. A drain-cock may be employed, however, in place of the plug.

From the preceding description, it will be seen that the vessel may have a smooth interior shell, free from inlet and outlet welds. The vessel does not have to be threaded in any way, to connect with inlet and outlet ducts; the nut 31 tightly clamps yoke 30 against the interior of the vessel and through bolt 27 draws fitting 25 down tightly against gasket 28 and the exterior of the vessel. The filter unit of the present invention, therefore, is particularly adapted for use in a glass or similarly-lined tank for chemical service.

The invention may be embodied not only in a filter unit that may be employed in a tank or other vessel, but also may be embodied in a filter unit that is complete in itself. Such a unit is illustrated in Fig. 3. The casing of this unit is denoted at 50. It is open at its upper end and has an inturned flange 51 formed at its upper end that is adapted to carry a fitting 52. This fitting is of generally cylindrical shape and rests on a gasket 53 that is interposed between the fitting and the flange 51 of the casing. The fitting 52 is provided with an inlet duct 55 of right angular shape, and with an outlet duct 56 that communicates with a recess or chamber 57. The recess 57 surrounds the inner end of the inlet duct 55 and is open to the interior of the casing 50.

The fitting 52 is secured to the casing 50 by a hollow bolt 58 which threads at one end into the fitting and whose other end projects through an opening in the bottom of the casing. A nut 59 threads onto the projecting end of the bolt. A gasket 60 is interposed between the nut 59 and the outside wall of the casing. When the nut is threaded up the fitting is drawn down against the gasket 53 and seats firmly against the top of the casing; and the casing is simultaneously clamped firmly between fitting 52 and nut 59.

A collar 62 is mounted slidably on the bolt 58 inside of the casing. A filter 64 is carried by this collar. This filter is of generally cylindrical shape and surrounds the bolt 58. At its upper end it may seat around a collar 65 formed on the fitting 52. The filter is held tight against the fitting 52 by a coil spring 66 which is mounted on the bolt 58 and surrounds the same. The lower end of this spring seats against a cotter pin 67 that passes through the bolt 58 and the upper end of this spring seats against the collar 62. The bolt 58 has a plurality of outlet openings 68 in it just below collar 62; and it has a plurality of other outlet openings 69 in it below cotter pin 67 and just above the bottom wall of the casing.

Air or other fluid flowing into the casing through duct 55 in the fitting and through the hollow bolt 58 passes out through the openings 68 in the bolt, and then through the filter 64 and the recess 57 of the fitting out through the duct 56. As the air leaves the ports 68 it impinges against the bottom wall of the casing and any dirt and moisture carried by the air drops into the bottom of the casing. The velocity of the air is reduced before it passes through filter 64 by reason of having to travel upwardly through an area considerably greater than the diameter of tubular bolt 58.

The dirt and water collected in the bottom of casing 50 can be drained off through openings 69 in the bolt and duct 73 in plug 70 which threads into the nut 59. A duct 71 is drilled in the nut 59 to connect the lower end of the bolt 58 with duct 73. The plug 70 is shown open in Fig. 3.

A plug 72 in the bolt 58 serves to separate the two series of openings 68, 69 from one another. If only one series of openings were provided, for instance at 69, the high velocity air entering the filter would only drive the moisture and dirt, collected at the bottom of the vessel, upwardly and against the filter.

By substituting for the fitting 52 shown in Fig. 3 a fitting 75, such as illustrated in Fig. 4, the filter can be connected simultaneously to a plurality of inlets or outlets. The fluid to be filtered may enter the fitting 75 through the central duct 76 and the filtered product may pass out through ducts 77 and 78 which connect with a well or recess 79 formed in the fitting and surrounding the duct 76, or the fluid to be filtered may enter through duct 76 and either duct 77 or duct 78, while the filtered product passes out through duct 78 or duct 77 depending on which is used as an entry port. The lower end of the duct 76 is threaded for engagement with the bolt 58.

A similar fitting may be used in the apparatus of Fig. 1 in substitution for the fitting 25 of that figure.

Figure 8:
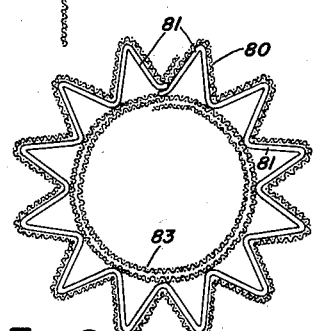
Fig. 8 is a view showing the filter rolled into the shape which it has when in use.

Referring now to Figs. 5 to 8, inclusive, I have shown a preferable form of filter for use in a filter unit constructed according to this invention. This filter comprises a piece of wire of suitable gauge which is corrugated for a portion of its length as indicated at 80 and is plain (uncovered) for that portion of its length, which is corrugated and covered with a suitable filter cloth 81 for another portion of its length as denoted at 82, and which is plain, uncovered, and uncorrugated for the rest of its length as denoted at 83. This strip of wire is adapted to be formed into a filter by first taking the end 83 and rolling it as shown in Fig. 8 to form a cylindrical supporting core and continuing to roll the strip so that the covered corrugations 82 surround this core portion 83 and then the uncovered corrugations 80 fit into the covered corrugations 82. The rolled wire 83 forms an internal support for the filter and the corrugated wire 80 serves to hold the covered corrugations 82 in place. Heretofore, clips or tongues have had to be provided on the casing of the filter, or on the filter support, to hold the corrugations and prevent the filter from unwinding. Nothing of this sort is required with a filter made according to the present invention. The corrugations 80 hold the covered corrugations 82 in place, while the core 83 helps make the whole a self-sustaining unit.

Obviously a filter made according to this invention can be used in conventional filter units, in substitution for conventional filters, as well as in filter units made according to the present invention.

It will be further understood that while the invention has been described in connection with different embodiments thereof, it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A filter unit comprising a casing, a fitting mounted in an opening in the casing and having inlet and outlet ducts formed therein, a filter mounted in the casing with one end seated against said fitting and surrounding said ducts, a hollow bolt threaded into the inlet duct and opening into the interior of the casing below the other end of the filter, a coil spring mounted on said bolt for pressing against the last-named end of the filter to hold its first-named end tightly against the fitting, and a nut threaded on the bolt to hold the fitting and casing together.

2. In combination, a vessel having an opening therein, a fitting mounted in said opening and having inlet and outlet ducts, a filter mounted in the vessel with one end surrounding said opening and having its other end closed, a hollow bolt threaded into one of said ducts and extending through the filter and through the closed end thereof and opening into the vessel below the closed end of the filter, a yoke member surrounding the first-named opening and mounted on said bolt within the filter, said yoke member having openings therein which communicate with the other of said ducts and means threadably engaging the bolt to tighten the yoke member against the interior of the vessel and simultaneously secure the fitting to the vessel.

3. In combination, a vessel having an opening therein, a fitting mounted in said opening and having inlet and outlet ducts, a filter mounted in the vessel with one end surrounding said opening and having its other end closed, a hollow bolt threaded into one of said ducts and extending through the filter and through the closed end thereof and opening into the vessel below the closed end of the filter, a yoke member surrounding the first-named opening and mounted on said bolt within the filter, said yoke member having openings therein which communicate with the other of said ducts, a nut threadably engaging the bolt to tighten the yoke member against the interior of the vessel and simultaneously secure the fitting to the vessel, and a second nut threadably engaging the bolt to hold the filter in position.

4. In combination, a vessel having an opening therein, a fitting mounted in said opening and seating against the outside portion of the vessel which surrounds said opening, said fitting having both inlet and outlet ports therein connecting with the interior of the vessel, a filter mounted in the vessel with one end surrounding both said ports and having its opposite end closed, a hollow bolt threaded into one of said ports and extending axially through and within the filter and through the closed end thereof and opening into the vessel below the closed end of the filter, and a nut threading onto the bolt to hold the fitting seated against the vessel, thereby to secure the fitting and vessel together.

5. In combination, a vessel having an opening therein, a fitting mounted in said opening and seating against the outside portion of the vessel which surrounds said opening, said fitting having both inlet and outlet ports therein connecting with the interior of the vessel, a filter mounted in the vessel with one end surrounding both said ports and seated against the interior portion of the vessel about both ports, said filter having its opposite end closed, a hollow bolt connected with one of said ports and extending axially through and within the filter and through the closed end thereof and opening into the vessel below the closed end of the filter, a nut threading onto the bolt to hold the fitting seated against the vessel, thereby to secure the two together, and separate means cooperating with the hollow bolt to clamp the filter against the interior of the vessel about said ports.

6. In combination, a vessel having an opening therein, a fitting mounted in said opening and seating against the outside portion of the vessel which surrounds said opening, said fitting having both inlet and outlet ports therein connecting with the interior of the vessel, a filter mounted in the vessel with one end surrounding said ports and having its opposite end closed, a hollow bolt connected at one end with one of said ports and opening into the vessel below the closed end of the filter, said bolt extending at its opposite end through an opening in the vessel and having a drain opening inside the vessel below the first-named opening in the bolt, and a manually operable valve closing said opposite end of the bolt.

7. In combination, a vessel, an inlet duct leading into and an outlet duct leading from said vessel and having ports which open into the interior of the vessel, a filter secured within the vessel surrounding both said ports at one end, an internally dished member closing the opposite end of the filter, a hollow bolt connected at one end with one of said ports and mounted within the filter and extending through the dished member, said bolt having an opening into the interior of the vessel below the dished member but within the dish thereof.

8. A filter unit comprising a casing having an opening therein, a fitting mounted in said opening to project externally beyond said casing, said fitting having a centrally-disposed port and an inlet duct leading from an external opening in one side of said fitting to said centrally-disposed port, and said fitting having an annular port surrounding said central port and an outlet duct leading from said annular port to an external opening in one side of said fitting, a filter mounted in said casing with one end surrounding both said ports and having its other end closed, a hollow bolt threaded into said central port and extending axially through said filter and through the closed end thereof and having an outlet opening below the closed end of said filter, means mounted on said bolt for holding said filter tightly about both said ports, and a nut threaded on the bolt for securing the fitting against the casing.

CLAUDE F. HASSELWANDER.

REFERENCES CITED

The following references are of record in the file of this patent:

UNITED STATES PATENTS

| Number | Name | Date |
|---|---|---|
| 1,091,695 | Nolden | Mar. 31, 1914 |
| 1,639,132 | Greene | Aug. 16, 1927 |
| 1,922,688 | Kamrath | Aug. 15, 1933 |
| 2,085,155 | Heidbrink | June 29, 1937 |
| 2,170,074 | Hewitt | Aug. 22, 1939 |
| 2,322,548 | Sigmund | June 22, 1943 |
| 2,341,097 | Heebink | Feb. 8, 1944 |
| 2,377,549 | Gustaffsson et al. | June 5, 1945 |
| 2,413,769 | Kasten | Jan. 7, 1947 |

FOREIGN PATENTS

| Number | Country | Date |
|---|---|---|
| 727,975 | France | Apr. 5, 1932 |